(12) United States Patent
Jonsson

(10) Patent No.: US 8,531,137 B2
(45) Date of Patent: Sep. 10, 2013

(54) MODULAR NETWORKED LIGHT BULB

(71) Applicant: Greenwave Reality, PTE, Ltd., Singapore (SG)

(72) Inventor: Karl Jonsson, Rancho Santa Margarita, CA (US)

(73) Assignee: Greenwave Reality, PTE, Ltd., Singapore (SG)

(*) Notice: Subject to any disclaimer, the term of this patent is extended or adjusted under 35 U.S.C. 154(b) by 0 days.

(21) Appl. No.: 13/776,778

(22) Filed: Feb. 26, 2013

(65) Prior Publication Data

US 2013/0162166 A1    Jun. 27, 2013

Related U.S. Application Data

(63) Continuation of application No. 13/195,655, filed on Aug. 1, 2011, now Pat. No. 8,421,376, which is a continuation of application No. 12/795,395, filed on Jun. 7, 2010, now Pat. No. 8,013,545.

(60) Provisional application No. 61/254,709, filed on Oct. 25, 2009.

(51) Int. Cl.
*H05B 37/00* (2006.01)

(52) U.S. Cl.
USPC ........... 315/318; 315/312; 315/297; 315/307; 315/58; 362/227; 362/365; 362/801; 340/815.45; 340/855.9; 445/66

(58) Field of Classification Search
USPC ............... 315/312, 318, 307, 360, 291, 297, 315/169.1, 200 R, 185 R, 56, 58; 362/227, 362/249.02, 265, 362, 365, 441, 800, 801; 340/815.45, 855.8, 855.9; 445/60, 66, 69; 702/60, 62

See application file for complete search history.

(56) References Cited

U.S. PATENT DOCUMENTS

| | | | |
|---|---|---|---|
| 4,612,670 A * | 9/1986 | Henderson | ........................ 398/22 |
| 6,160,551 A | 12/2000 | Naughton et al. | |
| 6,492,897 B1 | 12/2002 | Mowery | |
| 6,528,954 B1 | 3/2003 | Lys et al. | |
| 7,014,336 B1 | 3/2006 | Ducharme et al. | |
| 7,651,245 B2 | 1/2010 | Thomas et al. | |
| 7,923,943 B2 | 4/2011 | Peker et al. | |
| 7,956,546 B2 | 6/2011 | Hasnain | |

(Continued)

FOREIGN PATENT DOCUMENTS

| JP | 2001-037505 A | 11/2001 |
|---|---|---|
| JP | 2006-525640 A | 11/2006 |

(Continued)

OTHER PUBLICATIONS

Fujikpm's LED business, World Wide Web site http://www.fujikom.com/en/products/led/.

(Continued)

*Primary Examiner* — Haiss Philogene
(74) *Attorney, Agent, or Firm* — Bruce A. Young

(57) ABSTRACT

A modular light emitting apparatus includes a light emitting device, a connector to couple to an AC power source, circuitry on a first electronics module to drive the light emitting device, and a support structure arranged to position and hold a second electronics module that conforms to a predetermined form factor.

20 Claims, 18 Drawing Sheets

(56) References Cited

U.S. PATENT DOCUMENTS

| | | |
|---|---|---|
| 8,013,545 B2 | 9/2011 | Jonsson |
| 8,102,127 B2 | 1/2012 | Melanson |
| 8,251,544 B2 | 8/2012 | Ivey et al. |
| 8,421,376 B2 * | 4/2013 | Jonsson ................. 315/318 |
| 8,422,889 B2 * | 4/2013 | Jonsson ................. 398/172 |
| 8,430,402 B2 * | 4/2013 | Diehl et al. ............ 273/143 A |
| 2004/0066652 A1 | 4/2004 | Hong |
| 2005/0231134 A1 | 10/2005 | Sid |
| 2006/0284734 A1 | 12/2006 | Newman |
| 2009/0059603 A1 | 3/2009 | Recker et al. |
| 2009/0267540 A1 | 10/2009 | Chemel et al. |
| 2010/0084992 A1 | 4/2010 | Valois et al. |
| 2010/0141153 A1 | 6/2010 | Recker et al. |
| 2011/0062874 A1 | 3/2011 | Knapp |
| 2011/0095687 A1 | 4/2011 | Jonsson |
| 2011/0095709 A1 | 4/2011 | Diehl |
| 2011/0098953 A1 | 4/2011 | Jonsson |
| 2011/0309735 A1 | 12/2011 | Parker et al. |
| 2012/0070153 A1 | 3/2012 | Jonsson |
| 2012/0126699 A1 | 5/2012 | Zittel |
| 2012/0146505 A1 | 6/2012 | Jonsson |

FOREIGN PATENT DOCUMENTS

| | | |
|---|---|---|
| JP | 2008-123737 A | 5/2008 |
| KR | 10-2002-0034855 A | 5/2002 |
| WO | 03026358 A1 | 3/2003 |
| WO | 03/077100 A1 | 9/2003 |
| WO | 2005/039144 A1 | 4/2005 |
| WO | 2009097400 A1 | 8/2008 |
| WO | 2009084016 A2 | 7/2009 |
| WO | 2009084016 A3 | 7/2009 |

OTHER PUBLICATIONS

Written Opinion of the International Searching Authority (WO/ISA) for PCT/US2010/053079, Korean Intellectual Property Office, Jan. 6, 2011, Including the International Search Report with Patent Family Annex.

International Search Report and Written Opinion of the International Searching Authority for PCT/US2010/053355, Korean Intellectual Property Office, Sep. 1, 2011.

Notice of Allowance for U.S. Appl. No. 12/795,406, United States Patent and Trademark Office, Dec. 24, 2012.

Notice of Allowance for U.S. Appl. No. 12/795,417, United States Patent and Trademark Office, Jan. 14, 2013.

International Search Report and Written Opinion of the International Searching Authority for PCT/US2010/053286, European Patent Office, Jul. 7, 2011.

Notice of Allowance for U.S. Appl. No. 12/883,596, United States Patent and Trademark Office, Dec. 13, 2012.

Non-Final Office Action for U.S. Appl. No. 12/883,596, United States Patent and Trademark Office, Oct. 16, 2012.

Non-Final Office Action for U.S. Appl. No. 13/195,655, United States Patent and Trademark Office, Jun. 21, 2012.

* cited by examiner

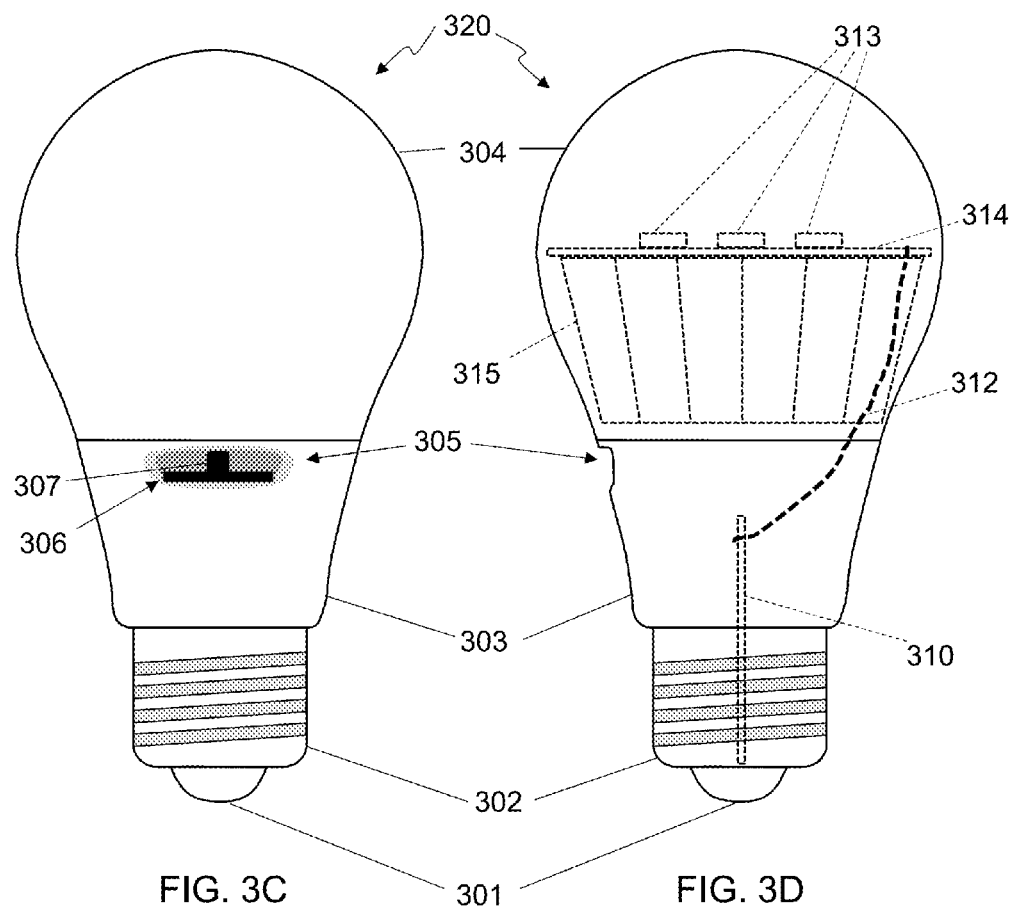

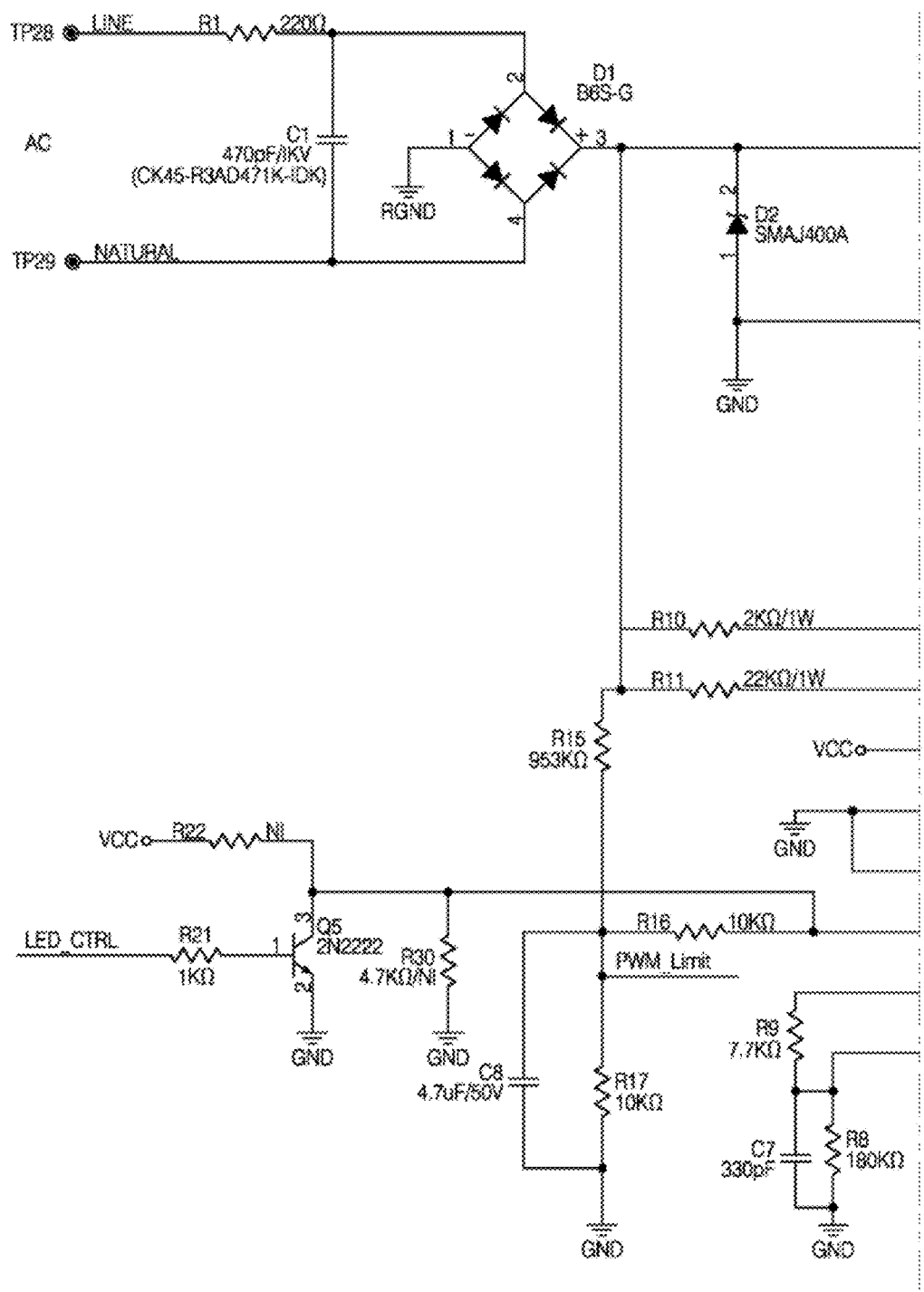
FIG. 6A₁

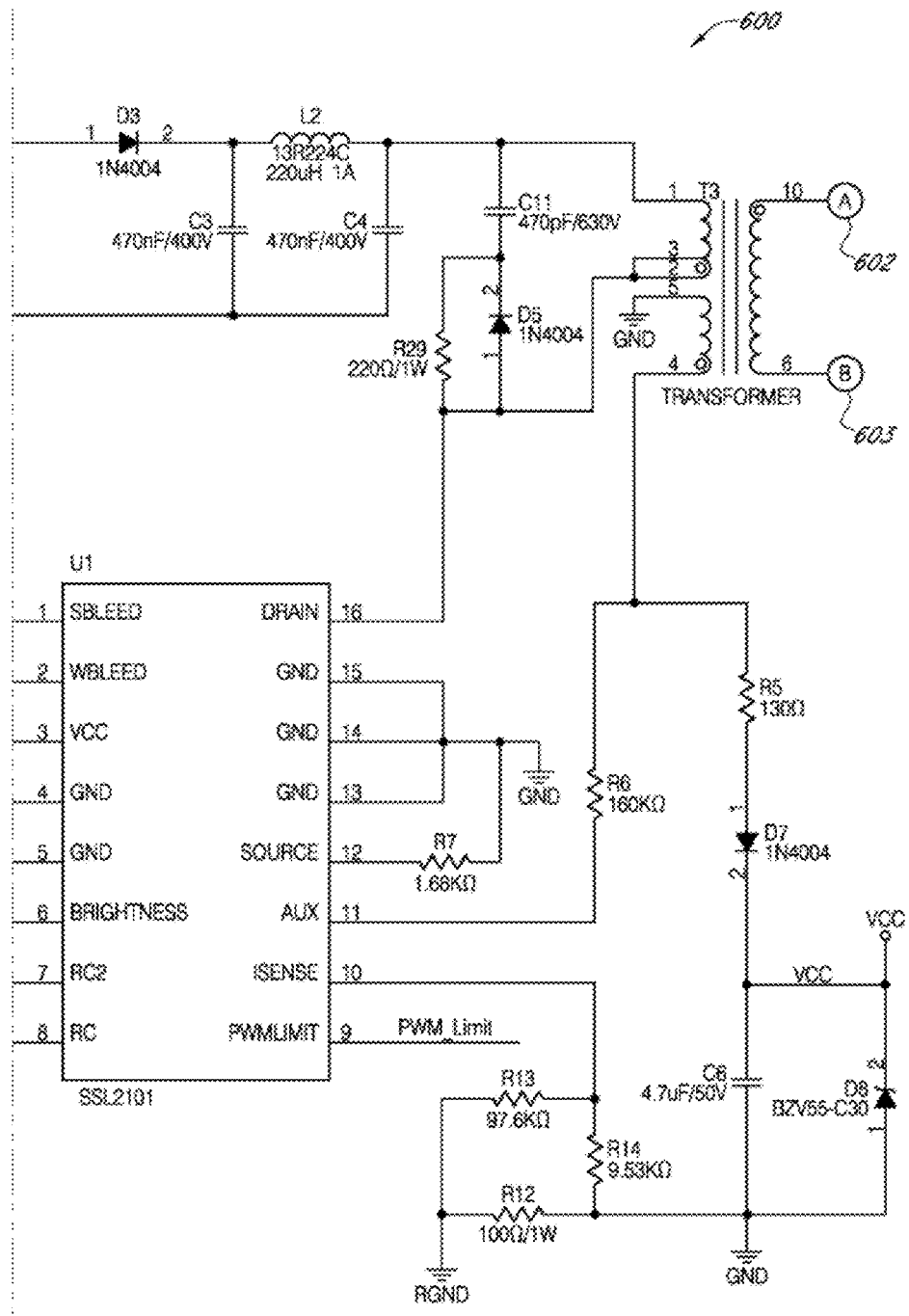
FIG. 6A₂

MODULAR NETWORKED LIGHT BULB

CROSS-REFERENCE TO RELATED APPLICATIONS

This application is a continuation of U.S. patent application Ser. No. 13/195,655, now U.S. Pat. No. 8,421,376, entitled "MODULAR NETWORKED LIGHT BULB" filed on Aug. 1, 2011, which is a continuation of U.S. patent application Ser. No. 12/795,395, now U.S. Pat. No. 8,013,545, entitled "MODULAR NETWORKED LIGHT BULB" filed on Jun. 7, 2010, which claims the benefit of U.S. Provisional Application 61/254,709 entitled "HYBRID LIGHT" filed on Oct. 25, 2009. The entire contents of all the aforementioned applications are hereby incorporated by reference.

BACKGROUND

1. Technical Field

The present subject matter relates to LED lighting. It further relates to a method of design and manufacture of networked LED light bulbs.

2. Description of Related Art

Providing home automation functionality using networking means is well known in the art. Control of lighting and appliances can be accomplished using systems from many different companies such as X10, Insteon® and Echelon.

In U.S. Pat. No. 6,528,954, inventors Lys and Mueller describe a smart light bulb which may include a housing, an illumination source, disposed in the housing, and a processor, disposed in the housing, for controlling the illumination source. The housing may be configured to fit a conventional light fixture. The illumination source may be an LED system or other illumination source. The processor may control the intensity or the color of the illumination source. The housing may also house a transmitter and/or receiver. The smart light bulb may respond to a signal from another device or send a signal to another device. The other device may be another smart light bulb or another device. They go on to describe a modular LED unit which may be designed to be either a "smart" or "dumb" unit. A smart unit, in one embodiment, includes a microprocessor incorporated therein for controlling, for example, a desired illumination effect produced by the LEDs. The smart units may communicate with one another and/or with a master controller by way of a network formed through the mechanism for electrical connection described above. It should be appreciated that a smart unit can operate in a stand-alone mode, and, if necessary, one smart unit may act as a master controller for other modular LED units. A dumb unit, on the other hand, does not include a microprocessor and cannot communicate with other LED units. As a result, a dumb unit cannot operate in a stand-alone mode and requires a separate master controller. The smart light bulb may be associated with a wide variety of illumination applications and environments.

Ducharme et al., in U.S. Pat. No. 7,014,336, describe systems and methods for generating and/or modulating illumination conditions to generate high-quality light of a desired and controllable color, for creating lighting fixtures for producing light in desirable and reproducible colors, and for modifying the color temperature or color shade of light within a prespecified range after a lighting fixture is constructed. In one embodiment, LED lighting units capable of generating light of a range of colors are used to provide light or supplement ambient light to afford lighting conditions suitable for a wide range of applications. They go on to describe a networked lighting system. U.S. Pat. No. 7,651,245 invented by Thomas, et al., shows an LED light fixture with internal power supply. They describe some embodiments where a radio frequency control unit can receive commands from a centralized controller, such as that provided by a local network, or from another control module positioned in a fixture in close proximity. Thus, the range of the lighting network could be extended via the relaying and/or repeating of control commands between control units.

Neither Lys and Mueller, Ducharme et al. nor Thomas, et al. discuss the way that the networking function is included in the light. They also do not address how a single design might be able to address a plurality of network environments. A variety of different networks are being used for home automation. So a need exists to easily be able to address different networking requirements with a single overall networked light bulb design.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings:

FIGS. 3C and 3D show a non-networked light bulb utilizing portions of the modular networked light bulb;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

The term "LED" refers to a diode that emits light, whether visible, ultraviolet, or infrared, and whether coherent or incoherent. The term as used herein includes incoherent polymer-encased semiconductor devices marketed as "LEDs", whether of the conventional or super-radiant variety. The term as used herein also includes organic LEDs (OLED), semiconductor laser diodes and diodes that are not polymer-encased. It also includes LEDs that include a phosphor or nanocrystals to change their spectral output.

The term "network" refers to a bidirectional communication medium and protocol to allow a plurality of devices to communicate with each other.

The term "networked device" refers to any device that can communicate over a network.

The terms "networked light fixture", "networked lighting apparatus" and "networked light bulb" all refer to a networked device capable of emitting light. While there are subtle differences in the generally agreed upon embodiments for these terms, they may be used interchangeably in this disclosure unless additional detail is provided to indicate that a specific embodiment is being discussed.

Reference now is made in detail to the examples illustrated in the accompanying drawings and discussed below.

Figure 1:
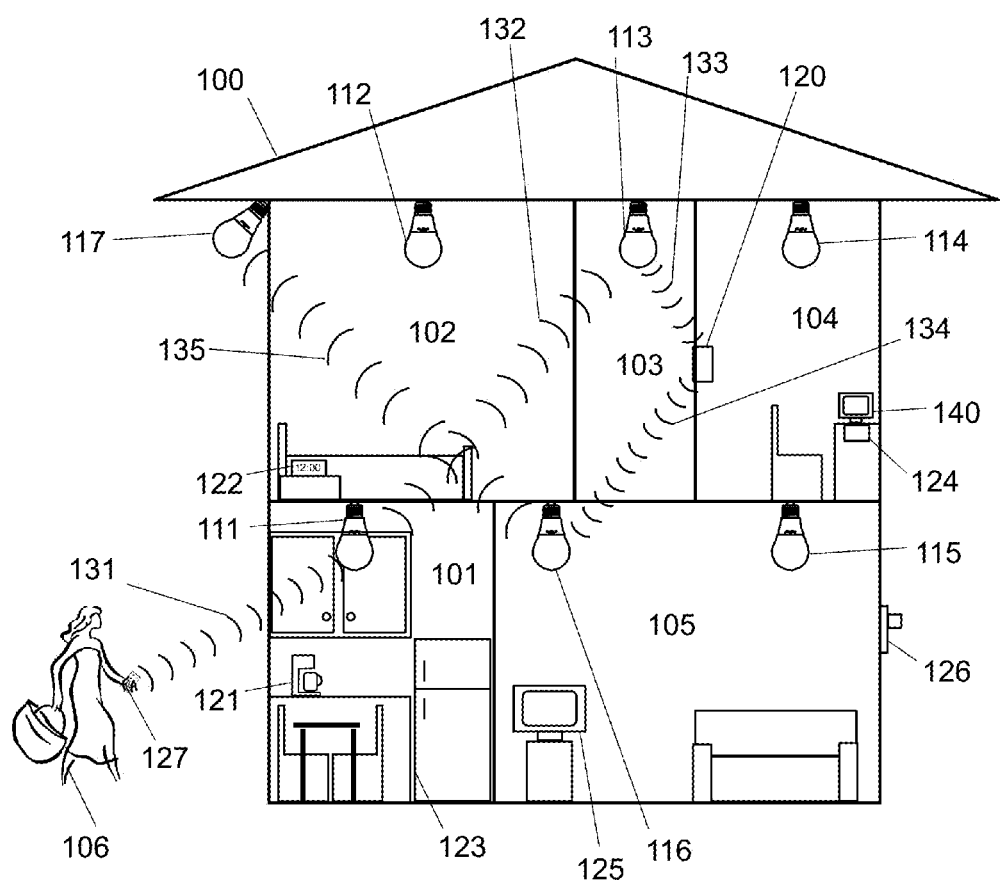
FIG. 1 shows a stylized view of a home with a plurality of networked home automation devices.

FIG. 1 shows a stylized view of a home 100 with a plurality of home networked devices 111-127. In the embodiment shown, the networked devices communicate over a wireless mesh network such as Z-wave or Zigbee (IEEE 802.15.4). Other wireless networks such as Wi-Fi (IEEE 802.11) might be used in a different embodiment. In other embodiments, a power line network such as X10 or HomePlug. In additional embodiments, a wired network could be used such as Ethernet (IEEE 802.3). In other embodiments, an optical network might be employed and some embodiments may utilize a heterogeneous network with multiple types of networks. This exemplary home has five rooms. The kitchen 101 has a networked light fixture 111, a networked coffee maker 121 and an networked refrigerator 123. The bedroom 102 has a networked light fixture 112, and a networked clock radio 122. The hallway 130 has a networked light bulb 113. The home office 104 has a networked light fixture 114, a network controller 120, and a home computer 140 connected to a network gateway 124. The living room 105 has two networked light fixtures 115, 116 and a networked television 125. External to the home is a networked floodlight 117 and a networked electric meter 126. Homeowner 106 is returning to her home with a networked remote control 127 and decides to turn on a networked floodlight 117 to light her way.

Figure 2:
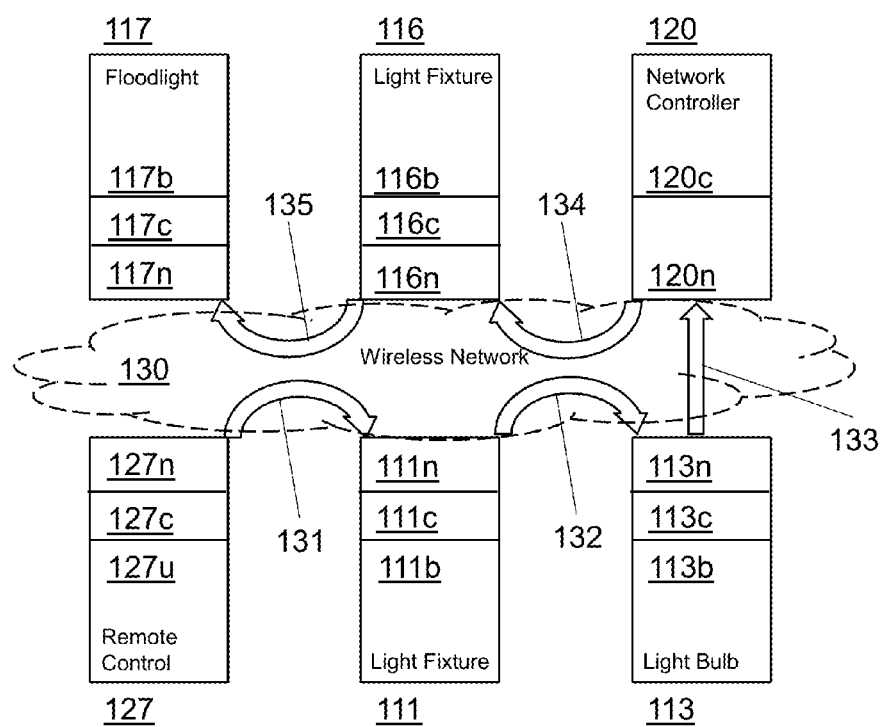
FIG. 2 a block diagram view of a network of home automation devices.

FIG. 2 shows a block diagram view of the automated home 100 showing only those devices involved with this particular instance of turning on the networked floodlight 117. The network 130 in this embodiment is a wireless mesh network meaning that individual devices can communicate with each other and that messages may be passed between intermediate devices to be able to reach its intended destination. In some cases, a message may be passed to a central network controller for processing but in other cases, a message may pass from an initiating device directly to a target device without involving the network controller. In the particular instance where the homeowner 106 presses a button 127u on the remote control 127, a controller 127c within the remote control 127 interprets the button press and creates a network message describing the task being requested. In this embodiment, the network message needs to be routed through the network controller 120 so the message created by the remote control controller 127c sets that up as the target of the message and passes the message to the network adapter 127n of the remote control 127. The network adapter 127n is unable to send the message directly to the network controller 120 so it sends a radio frequency network message 131 to the nearest networked device that is within range, is currently powered on, and has the capability to route the message 131 to another networked device to get it to the network controller 120. In this case, the coffee maker 121 happens to be off and the refrigerator 123 does not happen to have routing capability, so the radio frequency message 131 is accepted by the network adapter 111n of networked light fixture 111. The controller 116n in the networked light fixture 111 determines that the message 131 is not intended to turn on its LEDs 116b and it needs to be routed to the network controller 120 but the networked light fixture 111 and the network controller 120 are not able to directly communicate due to distance or interference so the controller 111c uses network adapter 111n to pass the message 131 to networked light bulb 113 as radio frequency message 132. The network adapter 113n and controller 113c determine that the message is not meant to turn on the LEDs 113b in the networked light bulb 113, and it is able to directly communicate with the network controller 120, so the controller 113c uses the network adapter 113n to send a radio frequency message 133 to the network controller 120.

The network adapter 102n of the network controller 120 accepts the message 133 and passes it to the controller 120c. It then interprets the command which may have multiple functions to perform such as adjusting the temperature of the home, disarming an alarm or other functions that are not specified here. But one function that is required is to turn on floodlight 117. So the controller 120c creates a message telling the floodlight 117 to turn on and has the network adapter 120n sends it to the light fixture 116 because the floodlight 117 is out of range of the network controller 120. So the message is passed to the light fixture 116 using its network adapter 116n and controller 116c and without turning on its light 116b. The light fixture 116 is within communication range of the floodlight 117 so it send the message to the floodlight 117. The network adapter 117n receives the message and passes it to the controller 117c which interprets the message and turns on the light 117b so that the homeowner 106 can find her way to the door.

Figures 3A, 3B:
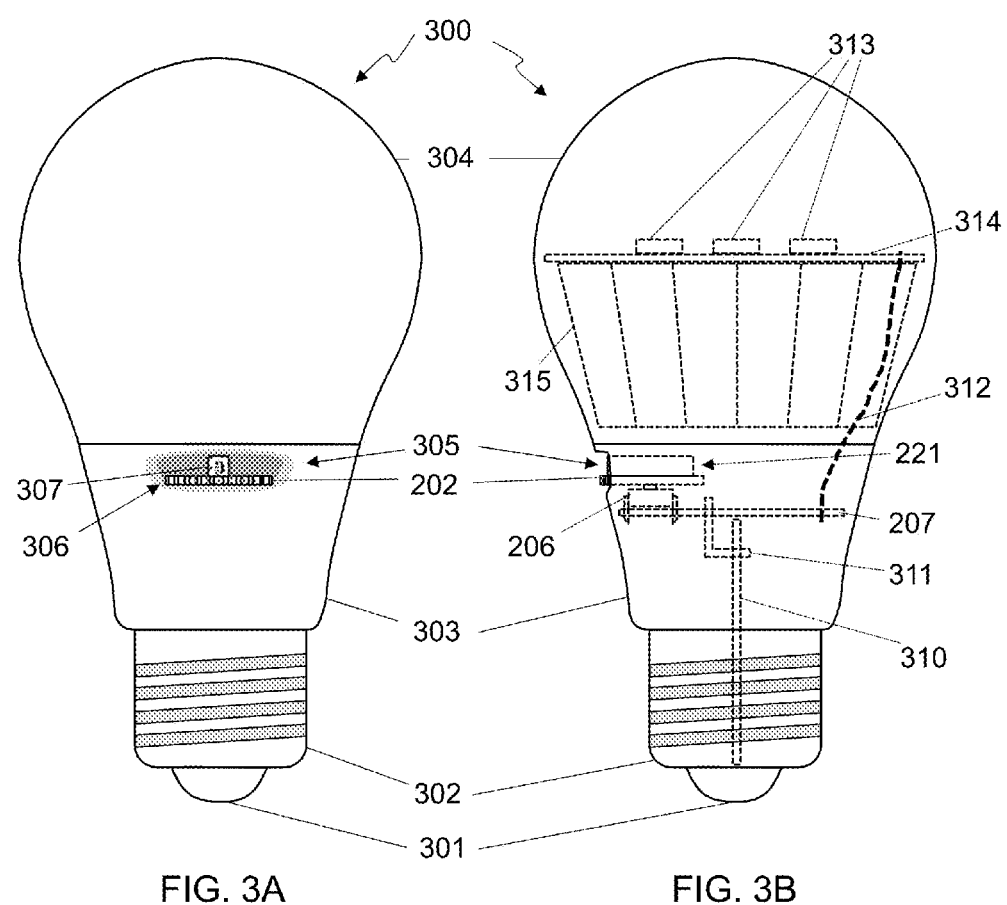
FIGS. 3A and 3B show a modular networked light bulb.

FIG. 3A shows a front view (with inner structure not shown) and FIG. 3B shows a side view (with selected inner structure shown in broken lines) of a modular networked light bulb 300. In this embodiment a networked light bulb 300 is shown but other embodiments of the present subject matter could be a permanently installed light fixture with a socket for a standard light bulb, or a light fixture with embedded LEDs or any other sort of light emitting apparatus. The light bulb 300 is AC powered but other embodiments could be battery powered or solar powered. The networked light bulb 300 of this embodiment has a base with a power contact 301 and a neutral contact 302, a middle housing 303 and an outer bulb 304. Each section 301, 302, 303, 304 can be made of a single piece of material or be assembled from multiple component pieces. In some embodiments, the power contact 301 and the neutral contact 302 are situated on an Edison screw fitting base as shown in FIG. 3 to allow the light bulb to be screwed into a standard light socket. The outer bulb 304 is at least partially transparent and may have ventilation openings in some embodiments, but the other sections 301, 302, 303 can be any color or transparency and be made from any suitable material. The middle housing 303 has an indentation 305 with a slot 306 and an aperture 307. A color wheel 221 is attached to the shaft of rotary switch 206 which is mounted on a networked controller circuit board 207. The networked controller circuit board 207 with the color wheel 221 is mounted horizontally so that the edge 202 of the color wheel protrudes through the slot 306 of the middle housing 303. This allows the user to apply a rotational force to the color wheel 221. As the color wheel 221 rotates, different sections of the colored area of the color wheel 221 are visible through an aperture 307. In FIG. 3, the current position of the color wheel 221 is such the color section with color 4 is visible through the aperture 307, indicating that the user has selected color 4 at this time. The color selection mechanism 428 may be designed to provide a detent at each section of the colored area to make it clear what color is currently selected.

In this embodiment, a LED driver circuit board 310 is mounted vertically in the base of the networked light bulb 300. A board-to-board connection 311 is provided to connect selected electrical signals between the two circuit boards 207, 310. A LED board 314 has a plurality of LEDs 313 mounted on it and is backed by a heat sink 315 to cool the plurality of LEDs 313. In some embodiments the LED board 314 with a plurality of LEDs 313 may be replaced by a single multi-die LED package or a single high output LED. In some embodiments the heat sink 315 may not be needed or could be a completely different configuration than what is shown. A cable 312 connects the networked controller circuit board 207 with the LED board 314. The cable 312 carries the power for the plurality of LEDs 313. In some embodiments it may be connect the LED driver circuit board 310 directly to the LED board 314 instead of passing the signals through the networked controller circuit board 207.

FIG. 3C shows a front view (with inner structure not shown) and 3D shows a side view (with selected inner structure shown in broken lines) of a non-networked light bulb 320 utilizing portions of the modular networked light bulb 300. The light bulb 320 is AC powered but other embodiments could be battery powered or solar powered. The networked light bulb 320 of this embodiment has a base with a power contact 301 and a neutral contact 302, a middle housing 303 and an outer bulb 304 in common with the networked light bulb 300. The indentation 305 with a slot 306 and an aperture 307 may still be in place even though they are not used by the non-networked light bulb 320. A plug or a sticker to cover the slot 306 and aperture 307 may be put in place to keep foreign material from entering the light bulb 320. In another embodiment, the non-networked light bulb 320 may utilize a different tool to make a different version of the middle housing, without any slot or aperture. The networked controller circuit board 207 and its associated components are not included in the non-networked light bulb 320.

In this embodiment, the LED driver circuit board 310 is mounted vertically in the base of the non-networked light bulb 320. In the same manner as it is mounted in the networked light bulb 300. The LED board 314 has a plurality of LEDs 313 mounted on it and is backed by a heat sink 315 to cool the plurality of LEDs 313. In some embodiments the LED board 314 with a plurality of LEDs 313 may be replaced by a single multi-die LED package or a single high output LED. In some embodiments the heat sink 315 may not be needed or could be a completely different configuration than what is shown. The LED driver circuit board 310 and the LED board 314 may be identical to those used in the networked light bulb 300. A cable 312 connects the LED driver circuit board 310 with the LED board 314. The cable 312 carries the power for the plurality of LEDs 313.

Figure 3E:
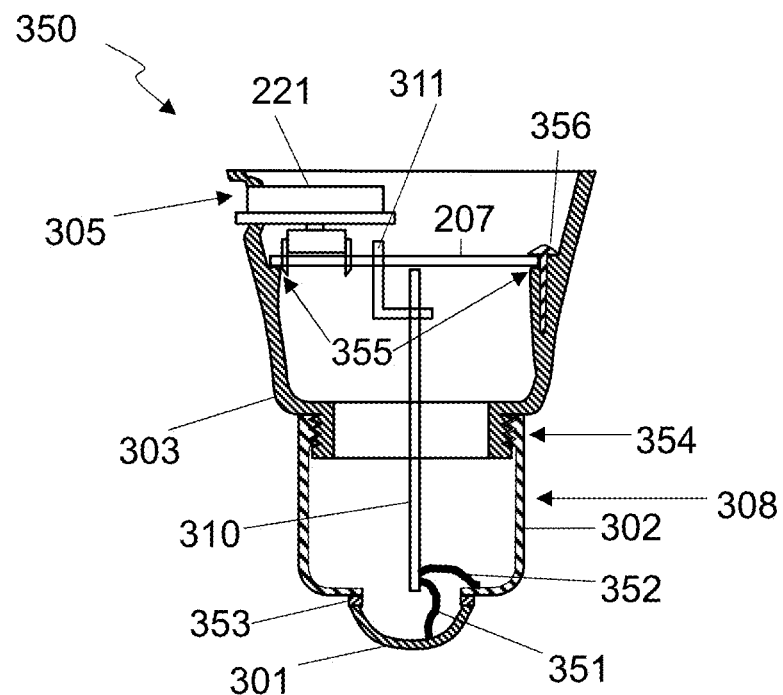
FIG. 3E shows a cross-section of a partially assembled networked light bulb.

FIG. 3E shows a cross-section of a partially assembled network light bulb 350 to show how one embodiment includes a support structure to position and hold an electronics module, in this case the networked controller circuit board 207. The partial assembly may include an Edison screw fitting base 308 with the power contact 301, isolated from the neutral contact 302 by an insulator 353. The middle housing 303 is attached to Edison screw fitting base 308. In this embodiment, screw threads 354 on middle housing 303 and Edison screw fitting base 308 are used to attach the two pieces together. The LED driver circuit board 310 (shown without components mounted), is attached to the power contact 301 using a power wire 351 and to the neutral contact 302 using a neutral wire 352. The LED driver circuit board 310 may be held in place in different ways in different embodiments such as board guides, potting compound, or adhesive. It is assembled into the middle housing 303 so that the board-to-board connection 311 is in the proper place to allow the networked controller circuit board 207 to make contact with the board-to-board connection 311 when it is mounted in the subassembly. In this embodiment, the middle housing 303 has a ledge 355 having an inner diameter smaller than the networked controller circuit board 207 so that the networked controller circuit board 207 can sit on the ledge 355 and not slide further into the middle housing 303. The ledge 355 may have screw holes at locations that line up with notches in the networked controller circuit board 207 so that screws 356 may be used to hold the networked controller circuit board 207 in place. The networked controller circuit board 207 may have a plurality of components mounted on it including, but not limited to, the color wheel 221. The color wheel 221 in this embodiment slides into the slot and aperture in the indentation 305 of the middle housing 303.

Figure 3F:
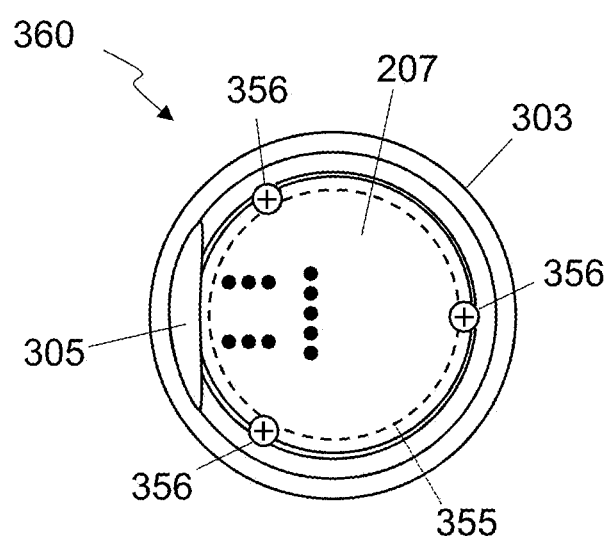
FIG. 3F shows a top view of a partially assembled networked light bulb.

FIG. 3F shows a top view 360 of the network controller circuit board 207 (with all components remove)d mounted into the middle housing 303. In this embodiment, the networked controller circuit board 207 is substantially round in shape and, from the top, the middle housing 303 is also round with the exception of the indentation 305 on one side which intrudes somewhat into the interior. The networked controller circuit board 207 sits on the ledge 355 in the middle housing 303 and is held in place in this embodiment with three screws 356 at attachment points, the screw holes in the ledge 355. Other embodiments may use other attachment means including, but not limited to clips, glue, snap-in detents or tabs.

Figure 4:
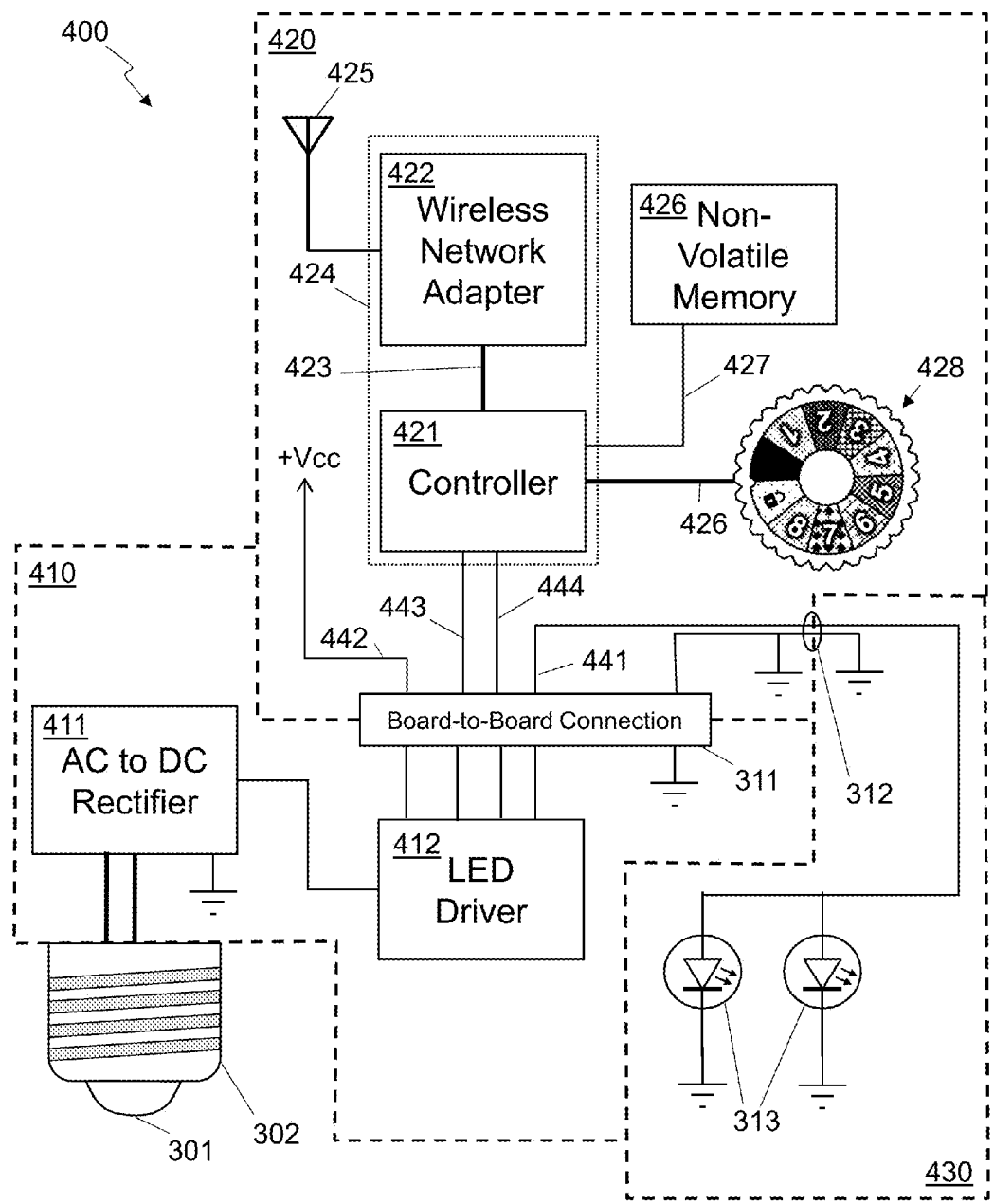
FIG. 4 shows a block diagram of the electronics utilized in one embodiment of the modular networked light bulb.

FIG. 4 shows a block diagram of the control electronics 400 used in the networked light bulb 300. While the following discussion directed primarily at the embodiment of a networked light bulb 300 the same principles and concepts can be applied by one skilled in the art to any other networked device. The block diagram is divided into three sections 410, 420, 430 corresponding to the three printed circuit boards of FIG. 3. Other embodiments may partition the system differently and have more or fewer printed circuit boards or circuit elements. The three sections are the LED Driver section 410 corresponding to the LED driver circuit board 310, the networked controller section 420 corresponding to the networked controller circuit board 207, and the LED section 430 corresponding to the LED board 314, The base with contacts 301, 302 provides AC power to the AC to DC rectifier 411 to power the LED driver 412. The LED driver may be an integrated circuit such as the NXP SSL2101 or similar parts from Texas Instruments or others. Several signals are shared in common between the LED driver section 410 and the networked controller section 420 through a board-to-board connection 311. The board-to-board connection 311 may be a pin and socket connector system, an edge finger connector system, soldered right angle pins, a cable, or any other method of connecting two boards. The shared signals comprise a ground connection, the LED power signal 441, a regulated power voltage 442, a control signal 443 and a serial communication signal 444. In some embodiments, the regulated power voltage 442 may be sufficient to power all the electronics in the networked controller section 420. In other embodiments, where more power is needed, a DC to DC converter may be included in the networked controller section 420 running off the LED power signal 441. The ground signal and the LED power signal 441 are then sent from the networked controller section 420 to the LED section 430 over cable 312. The LED section 430 may have a plurality of LEDs 313 powered by the LED power signal 441. The LED driver section 410 and LED section 430 could correspond to other sections that transform and consume electrical power or perform operations of a different embodiment of a networked device 300, such as the heating element of a networked coffee maker, under the control of the networked controller section 420.

The networked controller section 420 may have a wireless network adapter 422 that receives radio frequency signals through antenna 425 and is connected to controller 421 by a digital bus 423. In some embodiments, the wireless network adapter 422 may connect to a Z-wave, Zigbee (IEEE 802.15.4) or Wi-Fi (IEEE 802.11) wireless network. Other embodiments may use a wired or power line network adapter instead of a wireless network adapter. In some embodiments, the controller 421 is implemented as a microcontroller and in some embodiments, the controller 421, wireless network adapter 422, and digital bus 423 may be integrated onto a single chip 424 such as the Zensys ZM3102. In some embodiments a timer or clock function is included in the networked controller 420. A user interface, such as a color selection mechanism 428, is also connected to the controller 421 providing rotational position information through an electrical connection 426. In other embodiments a user interface may be provided using other means such as a graphical user interface on a display or a keypad or buttons or any other device or combination of devices that allows the user to make a selection and provide information on the selection to the controller 421. A non-volatile memory 426 also may be included in the networked controller section 420. The non-volatile memory 426 can be a flash memory, an EPROM, a battery-backed up RAM, a hard drive, or any other sort of memory device that retains its contents through a power cycle. The non-volatile memory 426 can be implemented as a single integrated circuit, a set of integrated circuits, a block of memory cells integrated with another function such as the controller 421 or the wireless network adapter 422 or any other implementation. The non-volatile memory 426 is connected to the controller through a digital connection 427. The digital connection could be an I2C bus, an SPI bus, a parallel connection, an internal bus within an integrated circuit, or any other electrical connections means, using a standard or proprietary protocol.

In some embodiments, the controller 421 controls the brightness of the plurality of LEDs 313 by driving the control signal 443 back to the LED driver 412. In one embodiment the controller 421 may simply drive the control signal 443 low to turn the plurality of LEDs 313 on and drive the control signal 443 high to turn the plurality of LEDs 313 off. In other embodiments, the controller 421 may drive the control signal 443 with a pulse-width modulated signal to control the brightness of the plurality of LEDS 313. In some embodiments, the LED driver section 410 is designed to accept power that has been controlled by a standard thyristor-based light dimmer which varies the phase where the AC power is active. This can interact with the dimming control taking place over the network. To determine the current dimming level of the LEDs 313, the networked controller section 420 may, in some embodiments, include circuitry to monitor the LED power signal 441 to determine the amount of dimming taking place. In other embodiments, the controller 421 may communicate with the LED driver 412 over the serial communications signal 444 to query and perhaps override the current dimming level. The serial communication signal 444 may also be used to communicate the current operating condition of the networked light bulb 300, actual measured power used if the additional circuitry to measure power is included in the networked light bulb 300, color temperature control, device temperature information or any other status or control information that might need to be communicated between the controller 421 and the LED driver 412 in a particular embodiment. The serial communication signal 444 may be implemented with a unidirectional or a bidirectional communication protocol such as RS-232, I2C, USB, SPI or any other standard or proprietary protocol. In some embodiments, it may be a multi-pin communication link utilizing serial or parallel communication protocols.

Figure 5:
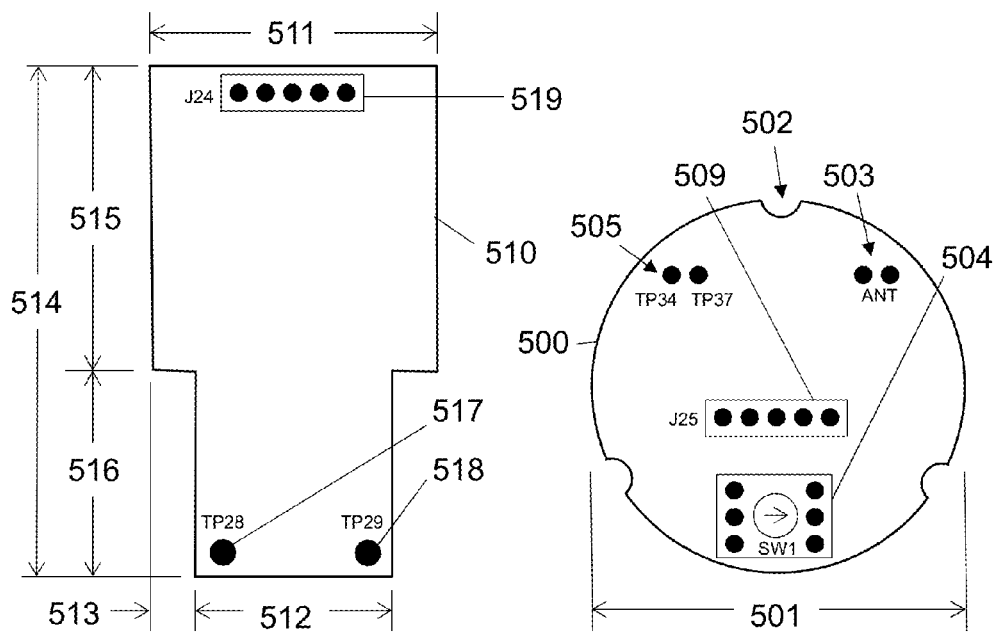
FIG. 5 shows mechanical designs for two printed circuit boards of one embodiment of a modular networked light bulb.

FIG. 5 shows the mechanical drawings 500, 510 of printed circuit boards for a particular embodiment of the networked light bulb 300. Mechanical drawing 510 is for an embodiment of the LED driver circuit board 310 used for the LED driver section 410. The exact shape and dimensions may vary in different embodiments but the dimensions for one embodiment are given here. The width 511 is 26 mm. The overall height 514 is 47 mm with the distance 516 from the bottom to the notches at 19 mm and the distance 515 from the notches to the top at 28 mm. The width 512 at the bottom is 18 mm with a notch width 513 on both sides of 4 mm. The LED driver circuit board 310 has two connection points, TP28 517 and TP29 518 that are used to connect to the power contact 301 and neutral contact 302 of the base 301. At the opposite end of the LED driver circuit board 310 is the connection J24 519 for the board-to-board connection 311. In this embodiment, 5 contacts are provided and a right angle 2.54 mm spacing header is used. The LED driver circuit board 310 consistent with mechanical drawing 510 can be installed into a partially assembled light bulb with the base and middle housing 303. Some embodiments might include contacts for the cable 314 to the LED board 314 but in this embodiment, the cable 312 can be directly soldered to connection points 4 and 5 of J24 519 if no networked controller circuit board 207 will be used.

Mechanical drawing 500 is for an embodiment of the networked controller circuit board 207. It is substantially round in shape to fit best within the shape of a conventional light bulb. The exact dimensions may vary between embodiments, but for one embodiment the diameter 501 is 34 mm. The outline of the board 500 has three semicircular cutouts 502 located at 120 degree spacing around the board 500, each semi-circular cutout having a diameter of about 3.5 mm. One possible placement of key components is shown. Connections 503 to an external antenna and connections 505 for the cable 312 to the LED board 314 could move to different locations in different embodiments. Some embodiments may use printed circuit antenna directly on the networked controller circuit board 207 and may not need an external antenna connection 503. The location for the rotary switch 206 is determined by the exact dimensions of the color wheel 221 so that the edge 202 can properly protrude through the slot 306 and a section of the colored area can be seen through the aperture 307. Some embodiments may incorporate different user interface means and not need a rotary switch 206 at all but this embodiment locates it at the SW1 location 504. The location 509 for the J25 board-to-board connection 311 on the networked controller circuit board 207 is shown. Its exact location is determined by the board-to-board connection 311 means chosen for a particular embodiment to allow the common signals 441-442 make the connection between the LED driver circuit board 310 and the networked controller circuit board 207.

Figure 6A:
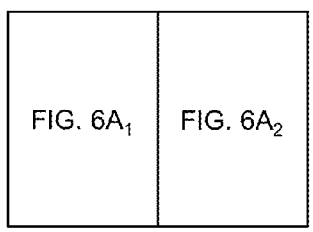
FIG. 6A-B shows a schematic for an LED driver board for a modular networked light bulb.
Figure 6B:
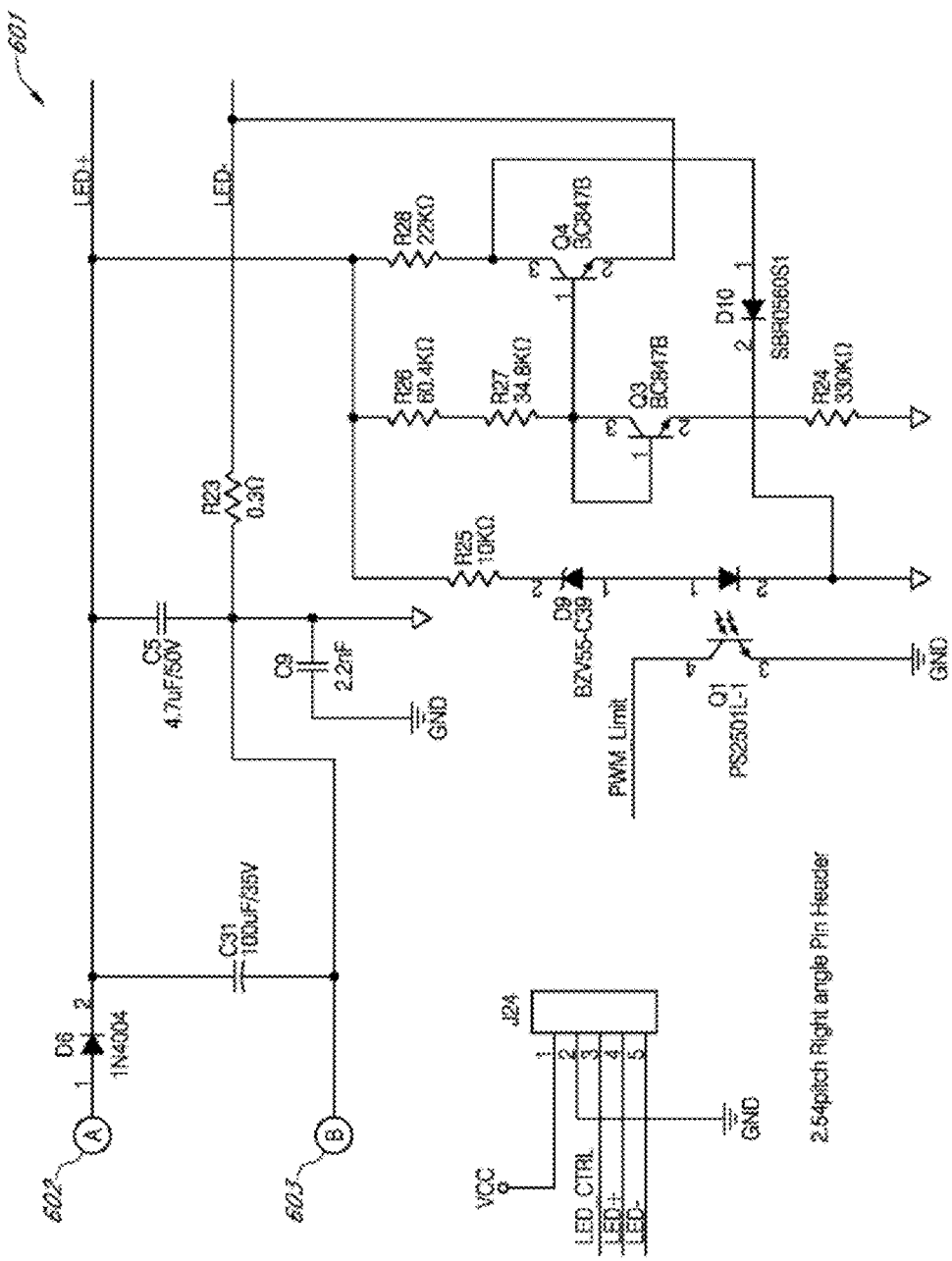

FIGS. 6A and 6B together constitute a schematic for one particular embodiment of a LED driver circuit board. FIG. 6A is split across two pages which are labeled FIG. 6A$_1$ and FIG. 6A$_2$ but should be viewed together as if they are attached at the dash-dot line. The first schematic section 600 and the second schematic section 601 have 6 connections in common. Two connections are explicitly shown with connectors A 602 and B 603. The other connections are implicitly shown using signal names VCC, GND, LED_CNTRL and PWM_Limt. The schematic 600, 601 uses industry standard symbols and component designations which are used in the following high level discussion of the schematic 600, 601. Low level details are not discussed so as to not obfuscate the overall functionality as they should be easily understood by one skilled in the art. AC power comes in at TP28 and TP29 and is then rectified using a full-wave rectifier D1. The rectified power is fed into U1, a switched mode power supply controller IC that operates in combination with a phase cut dimmer directly from rectified mains. It is designed to drive LED devices. The device includes a high-voltage power switch and a circuit to allow start-up directly from the rectified mains voltage. Furthermore the device includes high-voltage circuitry to supply the phase cut dimmer. The device used in this embodiment is an integrated circuit from NXP called the SSL2101. The data sheet of the NXP SSL2101, revision 04, released Aug. 28, 2009© NXP B.V. 2009, is herein incorporated by reference in its entirety. Application note AN10754, revision 03, released Oct. 16, 2009© NXP B.V 2009 gives application information on the use of the NXP SSL2101 and is herein incorporated by reference in its entirety. U1 utilizes a flyback circuit with T3 as the flyback transformer to isolate the LED drive signals LED+ and LED− from the AC mains. U1 uses its Drain pin to control the flyback circuit and thereby the brightness of the LEDs 313. U1 directly generates a VCC voltage at pin 3. The VCC voltage can vary depending on the current brightness level of the LED drive signals but will be less than 40V. The SSL 2101 has two control inputs: a BRIGHTNESS input that controls the output frequency and a PWMLIMIT pin the controls the on-time of the switch. The BRIGHTNESS input is driven from LED_CTRL which is the control signal 443 from the networked controller board 207. If LED_CTRL is high, transistor Q5 is turned on the BRIGHTNESS input is pulled to ground putting the output frequency down to fmin. Q5 also pulls PWMLIMIT low through a 10 kΩ resistor. Those two conditions drive the LED drive to its minimum level effectively turning the LEDs 313 off. The additional circuitry on the second page of the schematics 601 monitors the duty cycle of the LED drive signal and drives and optically isolated PWM_Limt signal back into the PWMLIMIT pin of the SSL2101. This allows the SSL2101 to dim the LEDs in response to a thyrister based dimmer on the incoming AC line. The board-to-board connection 311 is accomplished by soldering a right angle header into connector J24 with the VCC, Ground, LED_CTRL, LED+ and LED− signals to connect to the networked controller board 310 in this embodiment.

Figure 7:
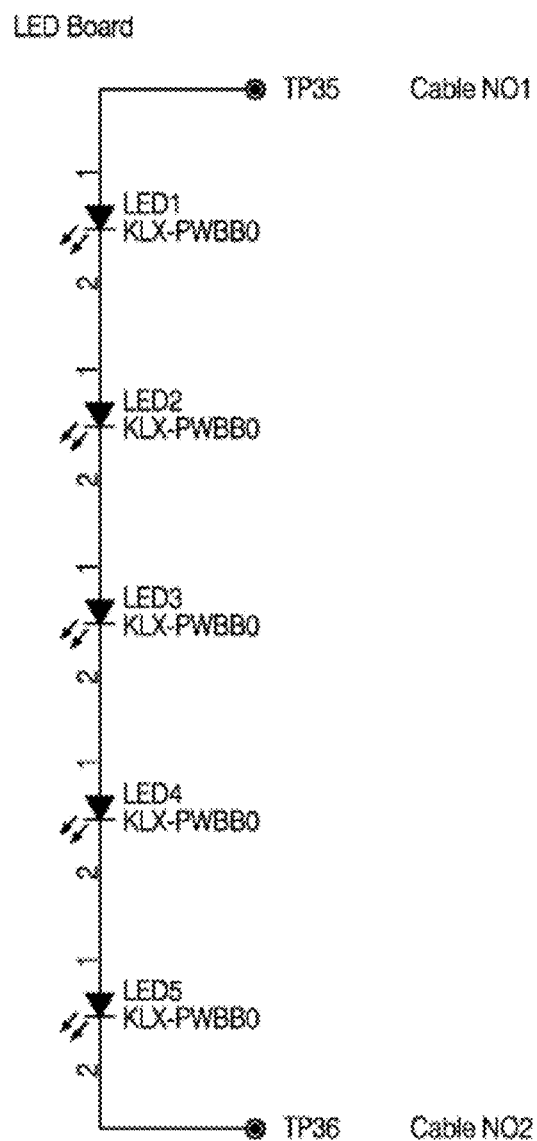
FIG. 7 a schematic for an LED board for a modular networked light bulb.

FIG. 7 shows a schematic for the LED board 314. In this embodiment, the LED board 314 has five high power white LEDs connected in series between the LED+ and LED− signals.

Figure 8A:
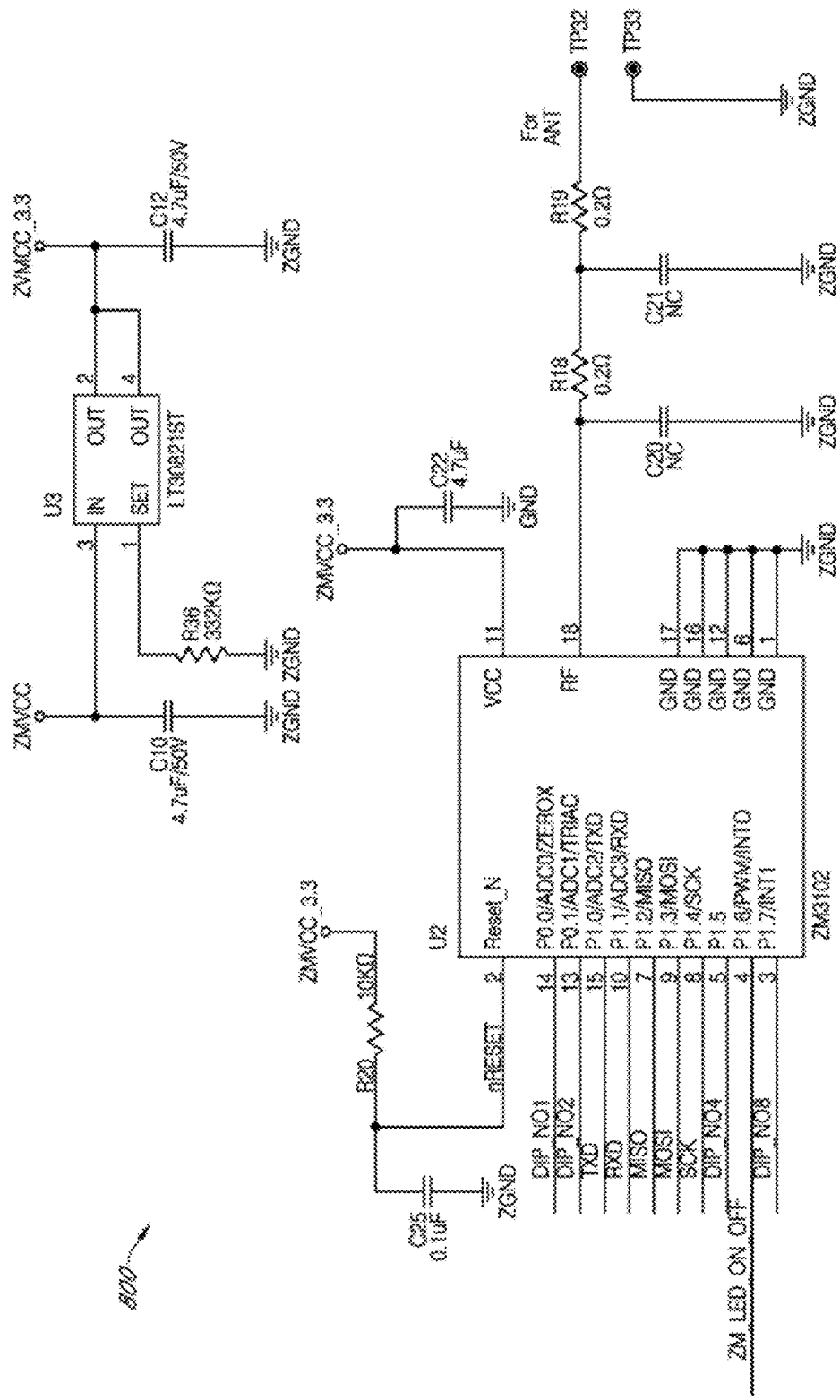
FIGS. 8A-B and 8C-D show schematics for two different embodiments of a networked controller board for a modular networked light bulb.
Figure 8B:
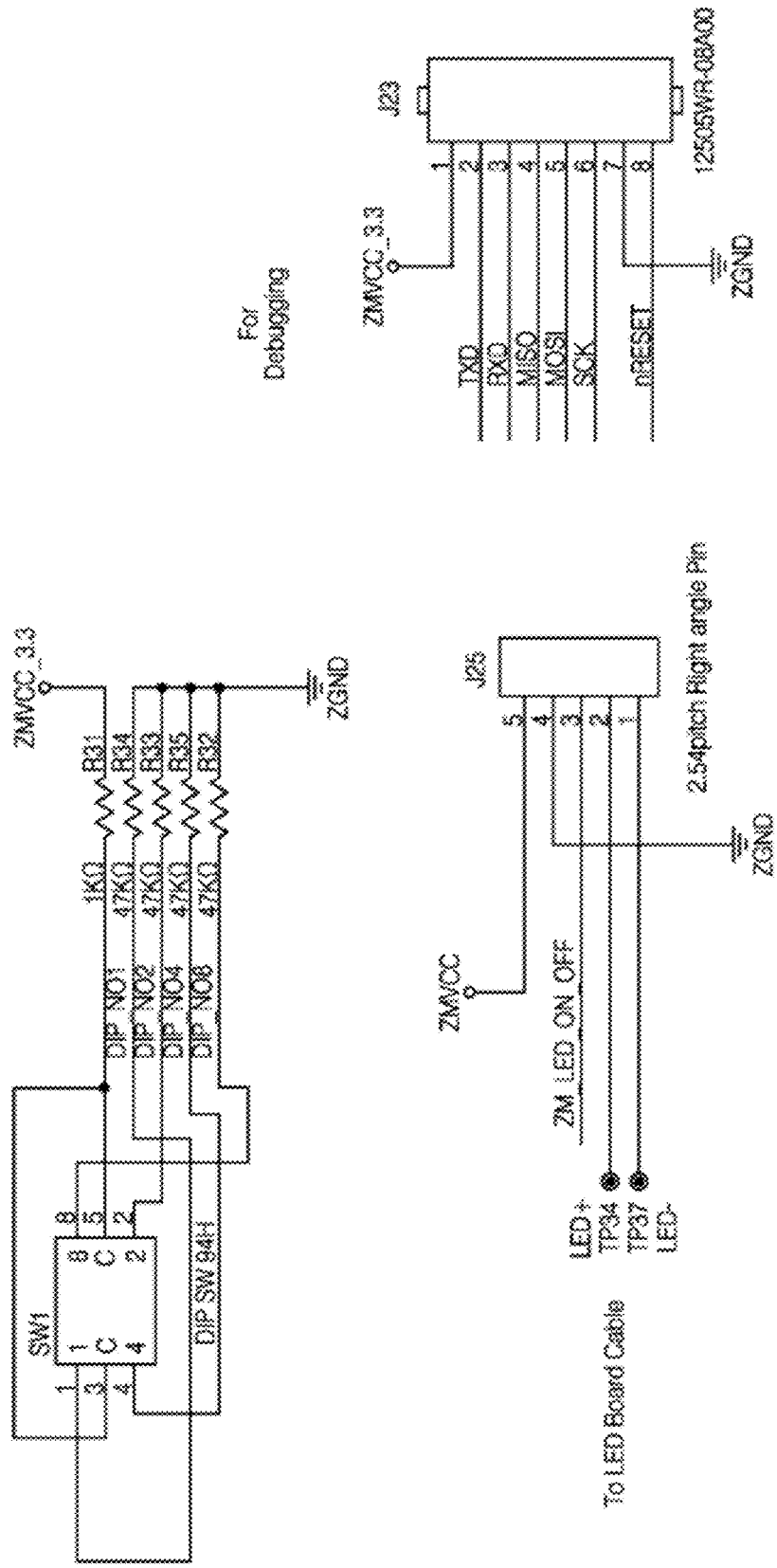
Figure 8C:
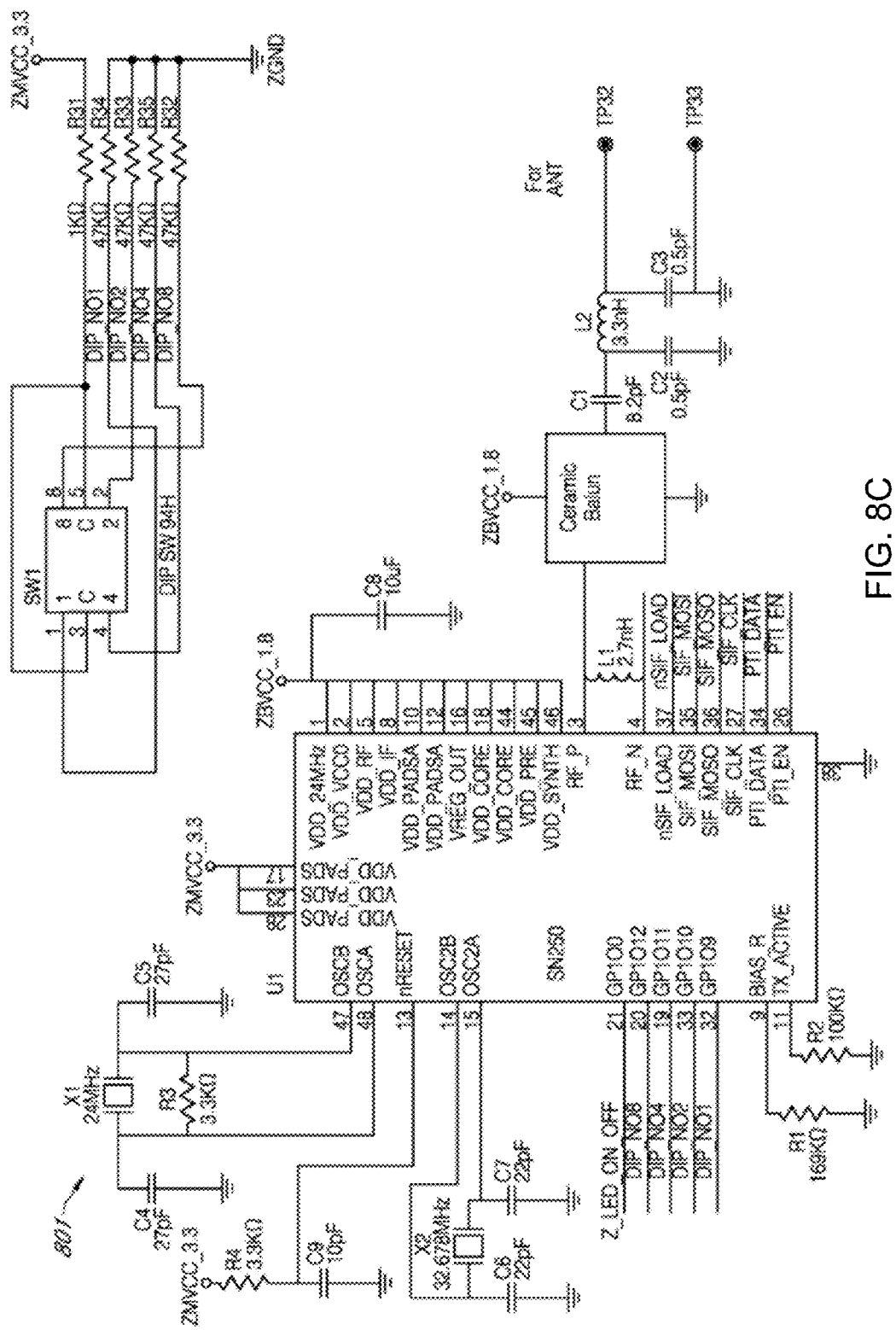
Figure 8D:
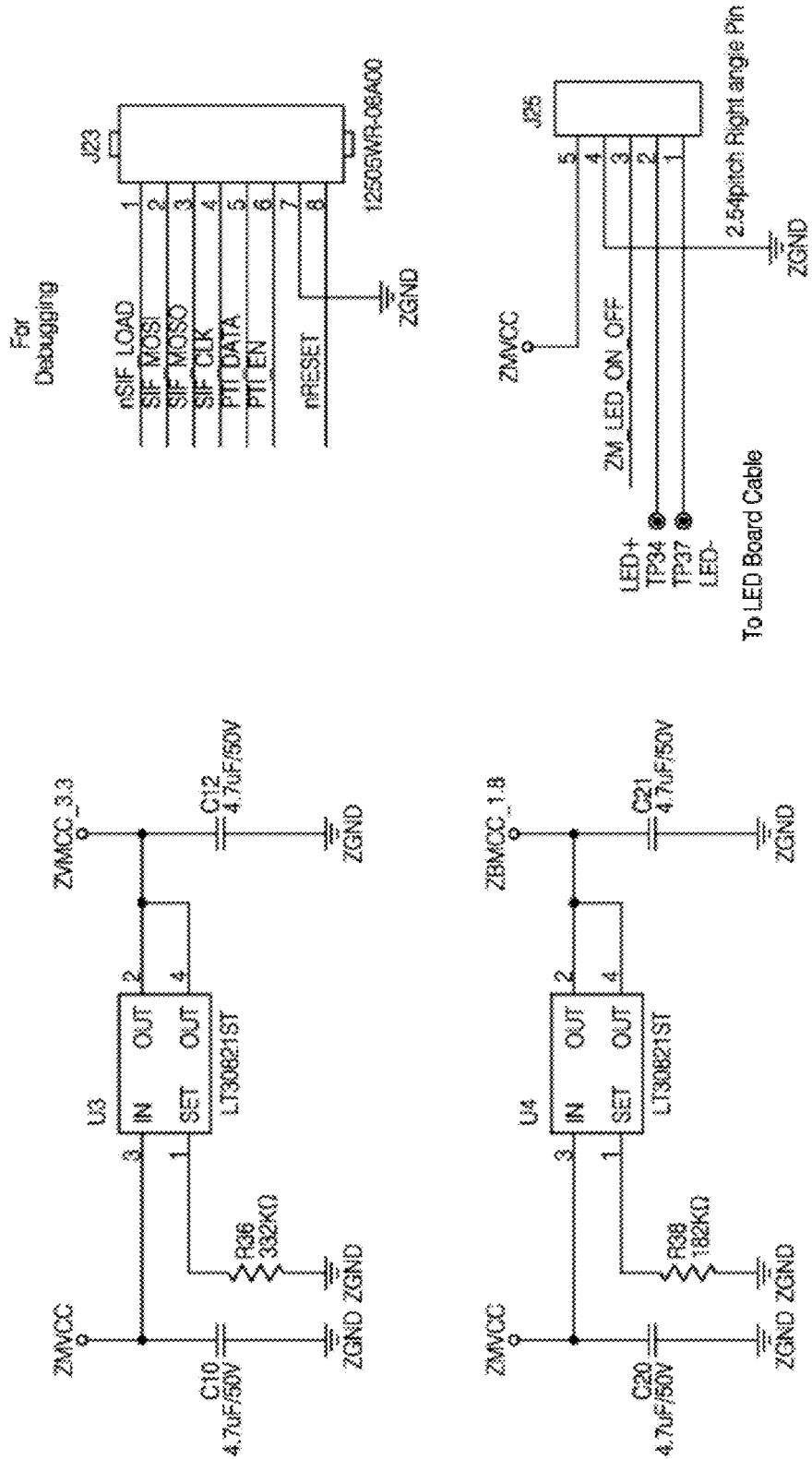

FIG. 8A-B and FIG. 8C-D show two different embodiments of a networked controller board 207. FIG. 8A-B shows an embodiment of a Z-wave networked controller board 207 and FIG. 8C-D shows an embodiment of a Zigbee networked controller board 207. Both boards have a debugging port J23 for use during development and test that has signals specific to each embodiment. Both boards also have a BCD encoded rotary switch SW1 for user entered configuration information. Each of the four outputs is a switch that is either open circuit or is connected to the common pins. In this embodiment, the common pins are tied to 3.3V and each output has a separate resistor to ground. The four outputs are named DIP_NO1, DIP_NO2, DIP_NO4 and DIP_NO8. Both boards also have the same connection to the shared signals 441-444 through connector J25. Since the VCC signal from the shared pins can vary widely, both boards have a DC-DC converter U3 that uses a resistor R36 with the value of 332 kΩ to cause the U3 to generate a 3.3V regulated DC signal. The Zigbee board 801 also requires 1.8V so a second DV-DC converter U4 is included in this design using a resistor R38 with the value of 182 kΩ to create a 1.8V regulated DC signal.

The Z-wave design 800 uses a Zensys ZM3102N module U2 based on the Zensys ZW0301 integrated circuit. The data sheet for the ZW0301 Z-Wave™ Single Chip Low Power Z-Wave™ Transceiver with Microcontroller, Revision 1 and the ZM3102N Datasheet, Integrated Z-Wave RF Module, Oct. 1, 2007, are both herein incorporated by reference in their entirety. It gets 3.3V power and uses an RC network using R20 and C25 to generate a reset signal. The four signals from the BCD rotary switch are routed to GPIO pins P1.7, P1.5, P1.1 and P0.0 to allow the microcontroller inside U2, functioning as the controller 421, to read their state. P1.6/PWM is routed to ZM_LED_ON_OFF to allow for control the brightness of the LED by the controller 421. Instructions written for the microcontroller in U2 allow it to implement the Z-wave network protocol as well as any other functionality required for the specific embodiment of the networked light bulb 300.

The Zigbee design 801 uses a SN250 from STMicroelectronics U2. The data sheet for the SN250 Single-chip ZigBee® 802.15.4 solution, revision 3, © 2007 STMicroelectronics Oct. 12, 2007 is herein incorporated by reference in its entirety. It gets both 1.8V and 3.3V power and uses an RC network using R4 and C9 to generate a reset signal. The four signals from the BCD rotary switch are routed to GPIO pins GPIO12, GPIO11, GPIO10, and GPIO9 to allow the microcontroller inside U2, functioning as the controller 421, to read their state. GPIO0 is routed to ZM_LED_ON_OFF to allow for control the brightness of the LED by the controller 421. Instructions written for the microcontroller in U2 allow it to implement the Zigbee network protocol as well as any other functionality required for the specific embodiment of the networked light bulb 300.

Figure 9:
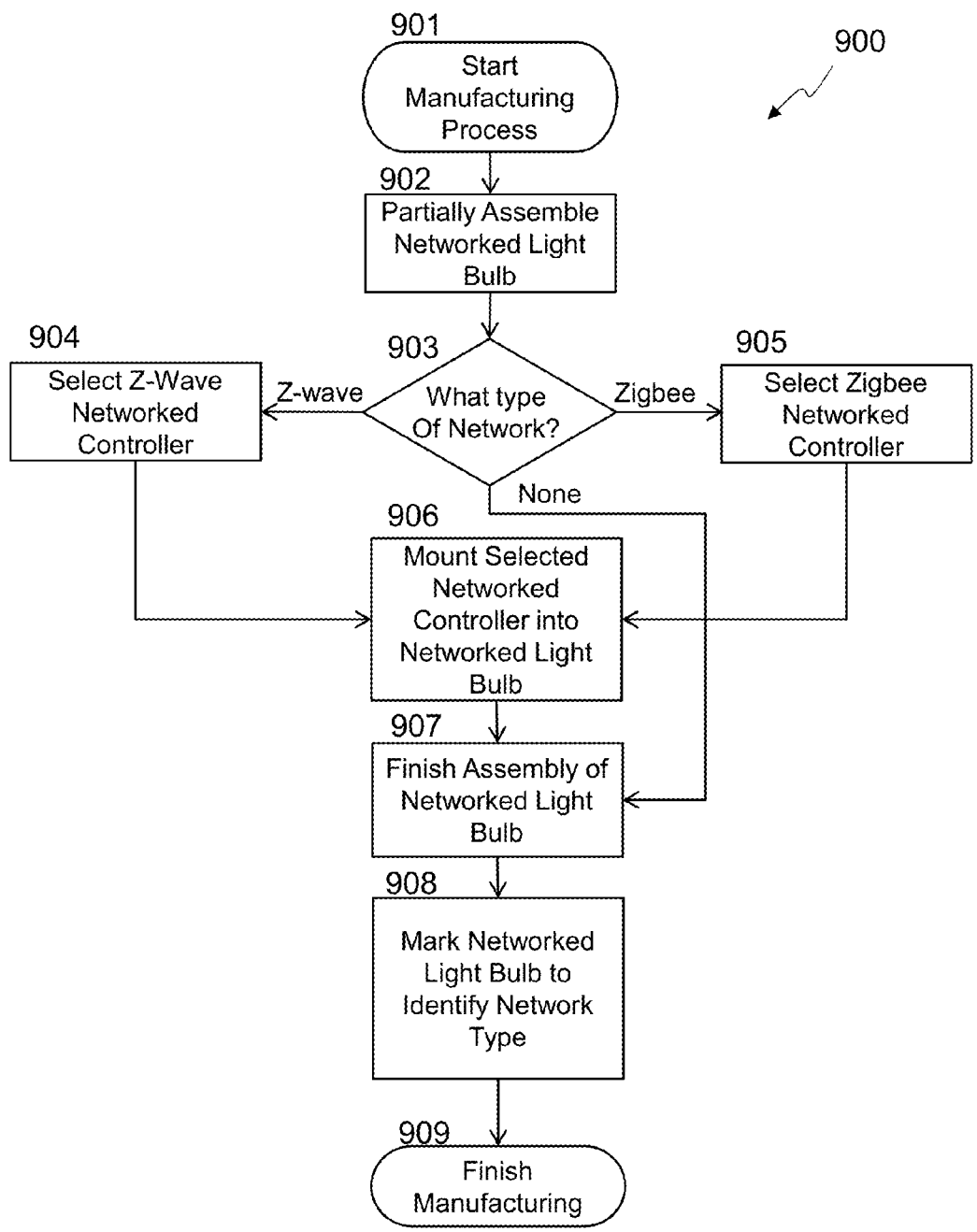
FIG. 9 shows a flow chart diagram for a manufacturing process for a modular networked light bulb.

FIG. 9 shows a flow chart for a manufacturing process to build two different versions of the networked light bulb. At the start 901 of the manufacturing process, all the various parts required to build the networked light bulb 300 are gathered and staged for manufacturing. A subassembly is created by partially assembling 902 some of the components. In one embodiment, the subassembly comprises the base with contacts 301 and 302, the middle housing 303 and the LED driver circuit board 310 with the contacts TP28 and TP29 electrically connected to the contact 301 and 302 respectively. This leaves the contacts 519 for J24, the board-to-board interconnect 311 at the end of the subassembly away from the base of the networked light bulb 300. A decision 903 then has to be made as to what kind of light bulb will be built. In this example, the light bulb could be built with a Z-wave networked controller 800, a Zigbee networked controller 801 or no networked controller to build a non-networked light bulb 320. In some cases, multiple different versions of a networked controller circuit board for the same network protocol may be available for selection to allow for second sourcing of that component. If a networked controller is chosen 904, 905, it is then mounted 906 in the top of the partially assembled light bulb. The semi-circular cutouts 502 fitting around positioning pins in the middle housing 303. The contacts 509 are then connected to the contacts 519 on the LED driver circuit board 310 fitting right angle header into holes in contacts 509 and soldering the two board together. Other board-to-board connection means, such as a pin and socket connector, may be used for other embodiments. Once the networked controller circuit board 207 has been mounted, or if a non-networked light bulb is being built, with no networked controller circuit board, the assembly 907 of the light bulb is completed. This can included soldering cable 312 to the networked controller circuit board 207 and the LED board 314 and installing the heat sink 315 and the pieces of the outer bulb 304. Once assembly is completed, in some manufacturing processes, the light bulb is tested. This might include tests targeted at the specific networking controller circuit board 207 selected. The bulb is then marked 908 to indicate the type of bulb, including the protocol supported by the networking controller circuit board 207 that has been mounted in the networked light bulb 300 or the fact that it is a non-networked light bulb 310. The marking may take the form of a specific part number encoded with information about the networking protocol selected or it may label the bulb with the networking protocol in words from a human readable language such as English. It may use trademarked terms for the network such as Zigbee® or may use a technical specification designation such as IEEE 802.15.4. Once the manufacturing process has been completed 909, the light bulb may be shipped to a customer, held in inventory, or incorporated into a larger assembly before shipping.

Figure 10:
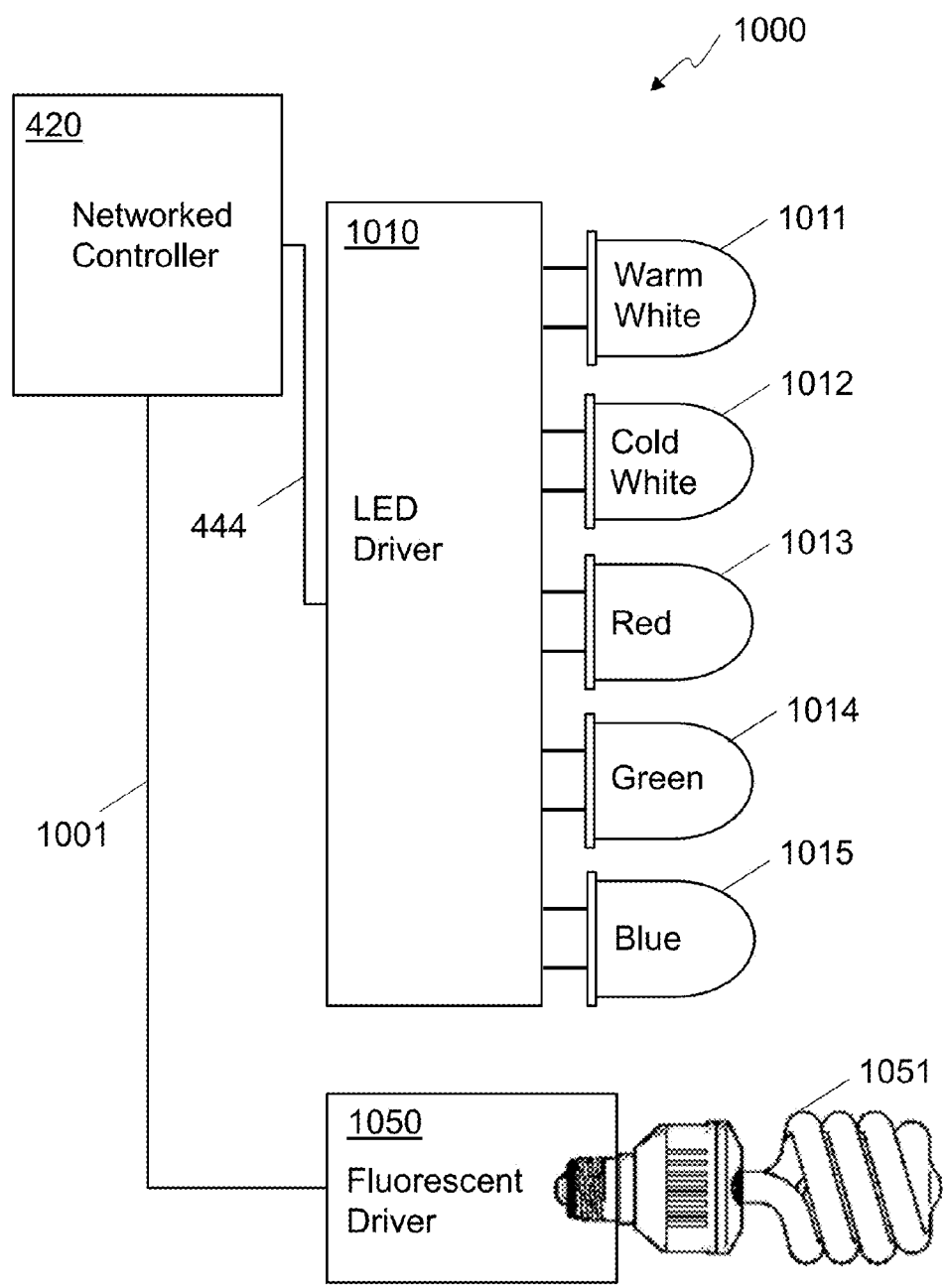
FIG. 10 shows a block diagram for an alternative embodiment of a modular networked light bulb.
Figure 11:
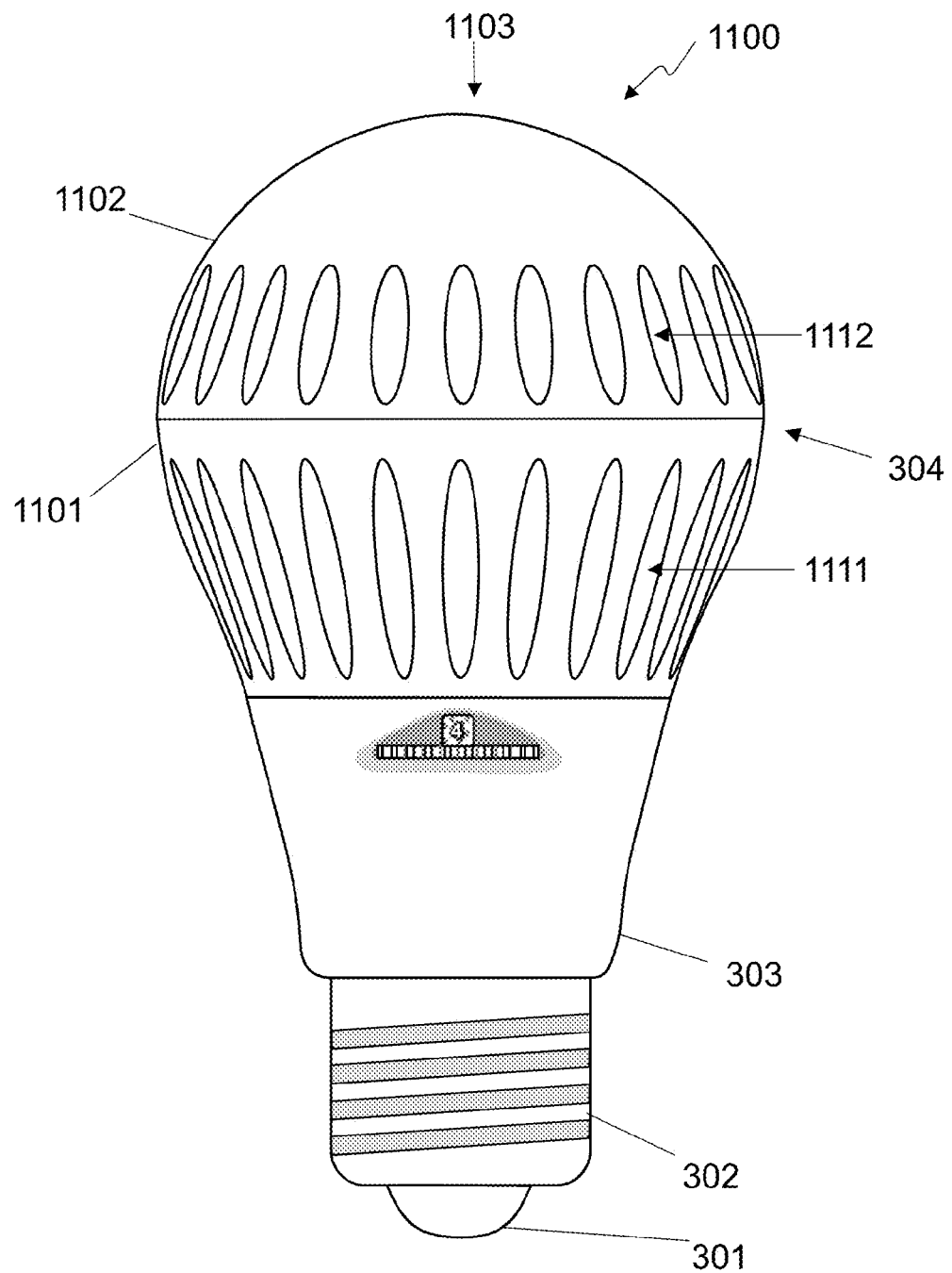
FIG. 11 shows a ventilation scheme for a modular networked light bulb.

FIG. 10 shows a part of an embodiment of a networked light bulb 1000. The power connection is not shown for clarity. The networked controller 420, in this embodiment uses the shared serial communication link 444 to communicate with the LED driver 1010 which then powers a plurality of LEDs 1011-1015.

Here, LED's having different spectral maxima are combined in a single hybrid light to increase the Color Rendering Index. In various embodiments, multiple LED chips are used and LED wafers are mixed in a single package. In an embodiment, all wafers are equivalent to a typical 2700K incandescent light bulb with a Color Rendering Index of about 85%.

In some embodiments, the LED Driver 1010 provides for separately driven LED's (as shown) in order to vary the proportions of light originating from the LED's. And, in some embodiments, varying the warm 1011 and cold 1012 color temperature LED's using independent pulse width modulation power supplies enables a user to control color temperature. Similar use of separate PWM power supplies for red 1013, green 1014 and blue 1015 LED's enable a user to vary color hues.

In an embodiment, five different LED's contribute to the light output of the hybrid light such that 60% of the of the light is emitted by a 2500K (Warm White) equivalent wafer plus phosphor LED 1011, 30% of the light is emitted by a 3500K (Cold White) equivalent wafer plus phosphor LED 1012, 3.3% of the light is emitted by a red (630 nm) LED 1013, 3.3% of the light is emitted by a green (520 nm) LED 1014 and 3.3% of the light is emitted by a blue (470 nm) LED 1015. Here, the Color Rendering Index is in a range of about 75 to 85 percent. As will be understood by persons of ordinary skill in the art, the above color temperatures, wavelengths, and mixing percentages can be varied in concert to achieve similarly high rendering indexes.

Some embodiments of the networked light bulb 1000 include a fluorescent lamp 1051 such as a compact fluorescent lamp. Here, a fluorescent lamp power block 1050 is interconnected 1001 with networked controller 420 and on command, adds its light to that of the LED's. The result of mixing the fluorescent and LED light is an improved Color Rendering Index approaching 100.

In operation, the networked light bulb 111-117, 300, 1000 can operate as a simple replacement for an incandescent bulb or it can be set to operate as a member of a network such as a home automation network. Where the networked light bulb 111-117, 300, 000 is operating in a network, its networked controller 420 provides for exchanging information with the network 130. Commands received from the network enable one or more of the networked light bulb's 111-117, 300, 1000 light sources 313, 1011-1015, 1051 to be operated at one or more levels of light output to enable control of light intensity, color rendering index and color hue among other things. Information available to the hybrid light may include energy consumption, estimated lifetime, color wheel identification and data inherent to the device that it may make available to other devices on the network. In an embodiment, another connected device such as a gateway device 124 relays a request from a personal computer 140 to the networked light bulb 111-117, 300, 1000 for energy consumption data. In some embodiments, the hybrid light transmits predetermined data items to another connected device such as a personal computer 140 on a regular basis.

FIG. 14 shows a ventilation scheme for a light bulb 1100. Light bulbs utilizing LEDs have to keep the LED die cool to maximize lifetime and stabilize their light output. The heat sing 315 is one part of a cooling solution but in order for the heat sink 315 to work, a flow of air must be provided to carry heat away from the heat sink 315 by convection. One embodiment of the light bulb 1100 has a base with contacts 301, 302, a middle housing 303 and an outer bulb 304. The outer bulb 304 of this embodiment is made up of two parts, the lower section 1101 and the upper section 1102. The lower section 1101 may be made of a transparent, partially transparent, or an opaque material and has ventilation holes 1111 around its outer surface to allow air to flow through. The upper section 1102 is made of a transparent or partially transparent material and it also has ventilation holes 1112 around its outer surface to allow are to flow through. The area 1103 of the upper section most distant from the base is kept free from ventilation holes 1102. This is done because most of the light is transmitted through this area of the outer bulb 304 and ventilation holes 1112 could cause shadows or other uneven lighting. The ventilation holes 1111, 1112 allow air to flow through the outer bulb 304, over the heat sink 315, allow convection to cool the LEDs.

If the light bulb is designed in the modular fashion discussed above, different versions of the light bulb can be assembled from a common set of parts. Such versions may include (a) a non-networked light bulb, (b) a networked light bulb with a first design of a first networked controller circuit board 207 containing a networked control section 420 supporting a first networking protocol, (c) a networked light bulb with a second, unique, design of a first networked controller circuit board 207 containing a networked control section 420 supporting the first networking protocol, (d) a networked light bulb with a first networked controller circuit board 207 containing a networked control section 420 supporting a second networking protocol, (e) a light bulb (networked or non-networked) with a different LED board 314 containing a different set of LEDs 313 that may be made up with a different selection of warm white 1011, cold white 1012, red 1013, green 1014 and blue 1015 LEDs, (f) a light bulb (networked or non-networked) with a different LED driver section 1010 and different LED board 314 containing a different selection of warm white 1011, cold white 1012, red 1013, green 1014 and blue 1015 LEDs, or many other versions utilizing common components.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to an element described as "an LED" may refer to a single LED, two LEDs or any other number of LEDs. As used in this specification and the appended claims, the term "or" is generally employed in its sense including "and/or" unless the content clearly dictates otherwise.

As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112, ¶6. In particular the use of "step of" in the claims is not intended to invoke the provision of 35 U.S.C. §112, ¶ 6.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A modular light emitting apparatus comprising:
    a light emitting device;
    a connector to couple to an AC power source;
    circuitry, on a first electronics module coupled between the connector and the light emitting device, to drive the light emitting device; and
    a support structure arranged to hold a second electronics module that conforms to a predetermined form factor.

2. The modular light emitting apparatus of claim 1, wherein said circuitry comprises an AC to DC converter; and
    the light emitting device comprises at least one LED.

3. The modular light emitting apparatus of claim 1, wherein the light emitting device comprises a compact fluorescent lamp.

4. The modular light emitting apparatus of claim 1, wherein the modular light emitting apparatus has a size and shape that substantially the same as a typical incandescent light bulb and the connector comprises an Edison screw fitting base.

5. The modular light emitting apparatus of claim 1, wherein no second electronics module is included, and the modular light emitting apparatus is marked to indicate that no network connectivity is supported.

6. The modular light emitting apparatus of claim 1, further comprising:
    the second electronics module comprising a networked controller, the second electronics module held by the support structure;
    wherein the networked controller is configured to communicate over a network and to control an aspect of operation of said circuitry; and
    the modular light emitting apparatus is marked to indicate a network protocol for the network.

7. The modular light emitting apparatus of claim 6, wherein the networked controller is configured to support a network protocol utilizing radio frequency communication.

8. The modular light emitting apparatus of claim 6, wherein the aspect of operation of said circuitry controlled by the networked controller is a brightness level of the light emitting device.

9. A lighting kit comprising at least a first light emitting apparatus and a second light emitting apparatus, the first and the second light emitting apparatus each respectively comprising:
    a light emitting device;
    a connector to couple to an AC power source;
    circuitry, on a first electronics module coupled between the connector and the light emitting device, to drive the light emitting device; and
    a support structure arranged to hold a second electronics module that conforms to a predetermined form factor.

10. The lighting kit of claim 9, wherein said circuitry of the first light emitting apparatus comprises an AC to DC converter; and
    the light emitting device of the first light emitting apparatus comprises at least one LED.

11. The lighting kit of claim 9, wherein the light emitting device of the first light emitting apparatus comprises a compact fluorescent lamp.

12. The lighting kit of claim 9, wherein the first light emitting apparatus does not include the second electronics module conforming with the predetermined form factor and is externally marked to identify that no network connectivity is supported.

13. The lighting kit of claim 9, wherein the first light emitting apparatus includes the second electronics module, the second electronics module comprising a networked controller;
    wherein the networked controller is configured to communicate over a network and to control an aspect of operation of said circuitry of the first light emitting apparatus; and
    the first light emitting apparatus is marked to indicate a network protocol for the network.

14. The lighting kit of claim 13, wherein the wherein the networked controller is configured to support a network protocol utilizing radio frequency communication.

15. The lighting kit of claim 13, further comprising a network controller.

16. The lighting kit of claim 13, further comprising a remote control device configured to send a message to the networked controller of the first light emitting apparatus;
   wherein the networked controller of the first light emitting apparatus is configured to control the aspect of the operation of said circuitry of the first light emitting apparatus in response to receipt of the message.

17. The lighting kit of claim 16, wherein the aspect of the operation of said circuitry of the first light emitting apparatus controlled by the network controller is an on-off state of the light emitting device of the first light emitting apparatus.

18. The lighting kit of claim 16, wherein the aspect of the operation of said circuitry of the first light emitting apparatus controlled by the network controller is a brightness of the light emitting device of the first light emitting apparatus.

19. The lighting kit of claim 13, wherein the networked controller of the first light emitting apparatus is configured to send a message to the second light emitting apparatus to control an aspect of operation of the second light emitting apparatus.

20. The lighting kit of claim 19, wherein the message sent by the networked controller of the first light emitting apparatus includes information related to a current state of the light emitting device of the first light emitting apparatus; and
   the second light emitting apparatus is configured to use the information to control a state of the light emitting device of the second light emitting apparatus to be similar to the current state of the light emitting device of the first light emitting apparatus;
   wherein the state of the light emitting device of the second light emitting apparatus is the aspect of the operation of the second light emitting apparatus.

* * * * *